United States Patent [19]

Matzuk

[11] 3,807,228

[45] Apr. 30, 1974

[54] ULTRASONIC VELOCITY AND MASS FLOWMETER

[75] Inventor: Terrance Matzuk, Pittsburgh, Pa.

[73] Assignee: Gulf Research & Development Company, Pittsburgh, Pa.

[22] Filed: Nov. 2, 1971

[21] Appl. No.: 194,957

[52] U.S. Cl. .............................. 73/194 E, 73/204
[51] Int. Cl. ............................................. G01f 1/00
[58] Field of Search .............. 73/194 E, 194 A, 204

[56] References Cited
UNITED STATES PATENTS 2,770,795  11/1956  Peterson .................... 73/194 A UX
3,019,647  2/1962  Beard et al. .......................... 73/204

*Primary Examiner*—Charles A. Ruehl
*Attorney, Agent, or Firm*—Meyer Neishloss

[57] ABSTRACT

A system for measuring the velocity of a flowing stream in a hostile environment, such as at high pressure and high temperature, by focusing acoustical energy through the conduit to a location within the stream to thereby remotely create "hot spots" which function as tracers. The travel time of the "hot spots" from a tracer production station to a detection station is used to find velocity. Means to make a focusing traverse to aid in mass flow determination is also provided.

13 Claims, 2 Drawing Figures

ULTRASONIC VELOCITY AND MASS FLOWMETER

This invention pertains to an instrument for measuring the velocity and/or the mass flow rate of flowing streams utilizing ultrasonically induced thermal transient events, or remotely created "hot spots," in the flowing stream.

It is generally known that acoustical flow meters are preferred over more conventional flow meters in hostile environments. The term "hostile environment" as used herein, pertains to the measurement of fluid and especially liquid flows in metallic pipes under high temperature and/or under high pressure and/or with various entrained solids in the liquid line and/or with liquids having very high viscosities. Turbine and similar moving part type of flow meters cannot function properly in such hostile environments. Orifice plates and the like metering devices foul or otherwise do not function properly in the hostile environments with which the invention will be used, because they suffer from calibration errors over periods of time. Such hostile environments are often found in petroleum refineries.

Conventional "transit-time" acoustical flowmeters, utilizing doppler shift principles and variations thereof are not satisfactory at low flow velocities in large conduits, as are often encountered in the petroleum field, nor do such flowmeters work satisfactorily through metallic pipe walls. The acoustical transducers, etc., of such meters, must physically penetrate the pipe walls. A "clamp-on" device, such as is used in the invention, is mandatory in applications such as process control where continuous refining processes may not be interrupted for purposes of installing metering equipment.

The above and other advantages of the invention will be pointed out or will become evident in the following detailed description and claims, and in the accompanying drawing also forming a part of the disclosure, in which:

Figure 1:
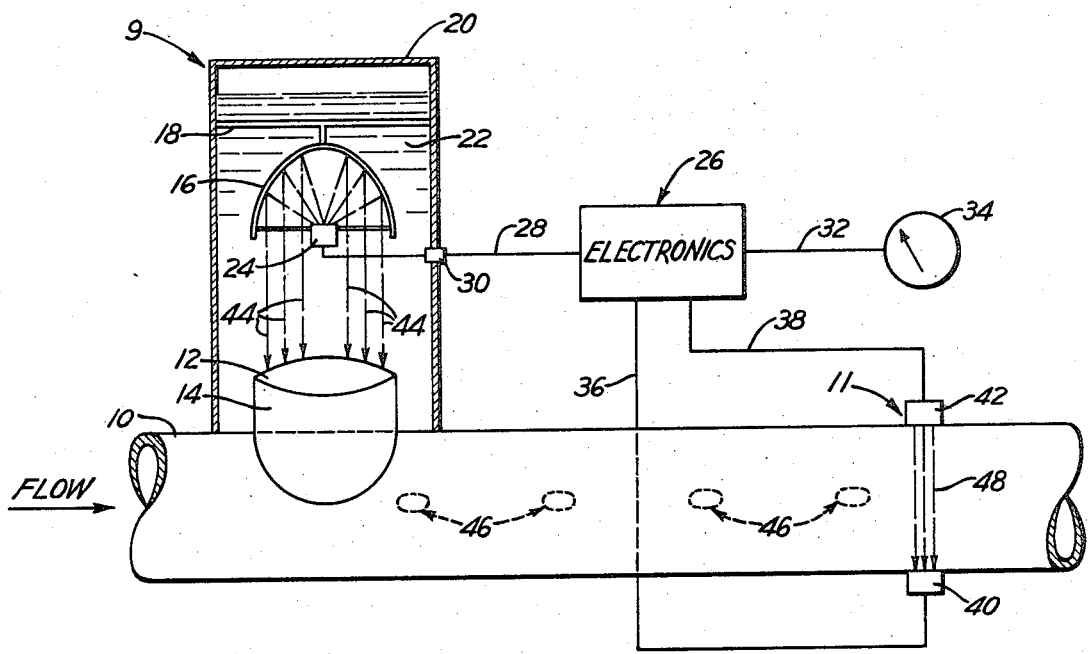
FIG. 1 is a general schematic view of apparatus embodying the invention.

Referring now in detail to the drawing, reference numeral 10 indicates a pipe or conduit through which flows a fluid the velocity of which and/or the mass flow of which it is desired to measure. The invention has particular utility where this flow is in a hostile environment as defined above. Heretofore, measurements on such flows in hostile environments was virtually impossible.

The present invention should be useful to measure a flow of gas as well as a flow of liquid. Existing technology for gas flows, such as turbine meters and the like, are a highly developed art and quite adequate for measuring normal gas flows. Thus, as a purely practical matter and not as a technical limitation, the invention would probably not ordinarily be used to measure a gas flow. However, it is conceivable that a gas flow could be found under such circumstances or such hostile conditions that use of the invention would be warranted. For this reason, therefore, the word "fluid" is used in the specification and especially in the claims herein to clearly indicate that the invention is not limited to use with liquids but can be used with any fluid as that word is defined in the dictionary.

In general, the invention operates by remotely thermally inducing a stream of "hot spots" in the flow at an upstream production station 9, and then detecting the passage of these functional tracers at a downstream detecting station 11. By measuring the time required for the tracers to travel from production station 9 to detection station 11, and since the distance between the stations is known, the flow velocity between the stations can be found. With regard to distance between stations, the factors to be considered include the lateral confinement of the heating acoustical beam due to focusing, the mean or lowest velocity anticipated, the mean specific heat of the liquid, the mean thermal conductivity of the liquid, and the temperature coefficient of the velocity of sound.

Production station 9 comprises an acoustical lens 12 mounted on the pipe or conduit 10 by means of a coupling or clamping shoe 14. A reflecting mirror 16 is mounted in spaced relation to lens 12 by mounting means 18 which may cooperate with a vessel 20 which contains the operating parts of station 9. The vessel 20 is filled with a good sound transmitting medium such as liquid 22, which liquid might be transformer oil. Vessel 20 is fitted and sealed to pipe 10 in a liquid tight manner by any suitable means such as a heavy grease or silicone oil, whereby this apparatus is easily removed from pipe 10 if desired. Mirror 16 is preferably of a parabolic shape, and an energy transducer 24 is positioned at the focus of the mirror by any suitable mounting means. For example, a spider could be fixed to the edges of the mirror 16 to hold the transducer 24 at the focus. Transducer 24 could be any suitable ceramic type, and would function as a high fidelity "tweeter" loudspeaker. For another reason, explained in detail below, means may be provided to permit relative motion between the lens 12 and the pipe, and the mirror 16 and the lens and the pipe. Such means could comprise manually operated lead screw mountings, or servo-mechanisms, or the like, to allow such motions and positionings.

The invention operates with sound waves, which, of course, is a well-known type of radiant energy. The scope of the invention includes any other energy, although it is presently thought that only sound can be used. Thus, lens 12 is a lens in that it directs and focuses acoustical energy, even though it is not made of glass and it does not operate with light. It is anticipated that lens 12 will be opaque and might be made of silicone rubber, or the like material. Lens 12 handles sound energy just as a lens made of glass handles light energy. The shoe 14 is needed to make a good clean connection or couple between the lens 12 and the conduit 10. This shoe could comprise a block of aluminum, molded epoxy, or such materials. Mirror 16 could be made of brass.

The electronics needed to time the various operations, to power the various components, and to perform all other functions as will be set forth below, are well within the skill of workers skilled in the electronics art after study of this specification. Therefore, all these various electronic circuitry are diagrammatically indicated together by a block 26.

A line 28 from circuitry 26 passing through suitable sealing means 30 in the wall of vessel 20 powers the transducer 24. A line 32 connects a meter 34 to circuitry 26. A pair of lines 36 and 38 connect a pair of sensing transducers 40 and 42, respectively, into the circuitry 26. The transducers 40 and 42 comprise the downstream detecting station 11 and may be any commercially available devices for establishing a known sound or other energy beam between themselves across the pipe, and for detecting an interference in that beam caused by the passage therethrough of a "hot spot" created at station 9 as described above. The devices 40 and 42 are so configured with respect to the shape of the conduit 10 that the beam established cannot be avoided by the "hot spots" or tracers produced upstream.

Figure 2:
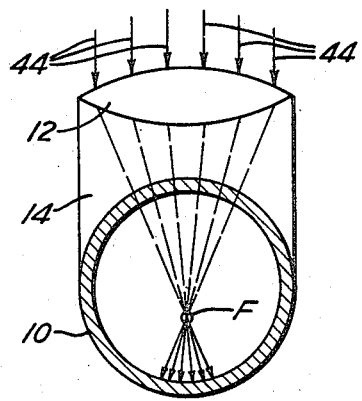
FIG. 2 is a diagram taken at right angles of the axis of the pipe illustrating the focusing traverse capability of the invention.

Referring to FIG. 2, it can be seen how the energy waves 44 from transducer 24 are focused inside the pipe 10 at a focal point F of the system including the lens. It is this focusing of the energy at a single location inside the fluid flow in the pipe 10 which is instrumental in the operation of the invention. Circuitry 26 drives transducer 24 intermittently, whereby each tone or energy burst from transducer 24 is reflected off mirror 16, and then collimated by the lens 12 and shoe 14 at a well focused volumetric region 46 to thus produce a stream of such regions 46 inside the flow in the pipe at the repetition rate of the tone bursts. Of course, lens 12 will be so configured as to compensate for the sonic refraction of both the shoe 14 and the material of conduit 10.

The operation of the invention for velocity measurement is now virtually self evident. The circuitry 26 drives the transducer 24 to produce a stream of "hot spots," tracers, local cavitation effects, or local discontinuities 46 within the liquid in the pipe by the focusing of such bursts of energy acting upon the liquid in the pipe. The flowing stream carries the externally induced "hot spots" or tracers from under the lens 12 to the sensors 40 and 42 at station 11. The passage of each of the discontinuities 40 through the beam 48 between the sensors 40 and 42 is detected and is transmitted back to the circuitry 26 via line 38. Thus, knowing the travel time of the tracers between stations and knowing the distance between the stations, it is then a pedestrian matter to calculate the velocity of the fluid carrying the tracers, and to then supply a signal on line 32 to meter 34 to directly read out this velocity. Of course, if desired, meter 34 could be made to read out any other parameter such as rate of energy burst production or time of tracer passage, or alternatively, or selectively, values for both these parameters.

The principle of operation of detection at 40, 42 is that the regions 46 are literally hotter than the surrounding liquid and therefore will transmit the energy of the interrogating beam with a different velocity than the cooler surrounding fluid. Thus, a change in the speed of transmission of beam 48 across the fluid in the pipe is an indication of the passage of one of the regions 46.

The invention is not limited to a thermal type of operation as described above. If the nature of the liquid in pipe 10 is such and if sufficient energy is supplied via the parts 12 through 24, then actual bubbles of gasified liquid could be created at region 46, and these gas bubbles used as tracers and picked up at transducers 40 and 42. Another analogous embodiment would comprise the physical addition of a gas to be used as a tracer, and adding such gas continuously in small quantities well away from the region at which the liquid in the pipe is in the so-called hostile environment. The gas would dissolve into the liquid, and the energy added by the invention could be used to create local gas/liquid separations, the separated gas bubbles then serving as the tracers.

When the invention is used to measure mass flow rate as opposed to simply velocity, it may be necessary to take a velocity reading traverse or a velocity profile across a pipe, i.e., measure the velocity at several different points within the flow within the pipe. To determine mass flow rate the viscosity and density of the fluid in the pipe must be known, and an assumption made as to whether the flow in the pipe is laminar or turbulent. After these initial conditions are determined, standard equations based on Reynolds Number can be used to determine mass flow rate from velocity measurements. Where all flow conditions are known then a single velocity measurement in these equations can be used to determine mass flow rate. If flow conditions are not fully known, as through an elbow, or near a nozzle, or near a pump, or the like, then the laminar or turbulent nature of the flow will have to be determined by means of a focusing scan, and thereafter the known mathematical analytical techniques applied. For a fuller explanation of this part of fluid dynamics, reference may be had to Theory and Problems of Fluid Dynamics, by W. F. Hughes and J. A. Brighton, Schaum Publishing Co., New York, copyright 1967.

In order to make such a traverse, referring to FIG. 2, i.e., to move the focus point F up and down on a diametric line, it is necessary to provide means to move the lens 12 with respect to the pipe and/or to change the configuration and/or the location of the mirror 16 with respect to the lens. Apparatus to accomplish these ends was mentioned above and others will present themselves to those skilled in mechanics, and need not be explained in further detail here.

While the invention has been described in detail above, it is to be understood that this detailed description is by way of example only, and the protection granted is to be limited only within the spirit of the invention and the scope of the following claims.

I claim:

1. A method for determining the velocity of fluid flow in a conduit comprising the steps of producing bursts of energy at an upstream station on the conduit, transmitting said bursts of energy through focusing means and through the wall of said conduit to focus each of said bursts of energy in the fluid in said conduit at said upstream station, detecting the passage of the "hot spots" created by each focused burst of energy at a downstream station on the conduit, determining the distance between said stations, determining the travel time of said "hot spots" between said stations, and producing a signal proportional to the speed of fluid flow between said stations from said distance and said travel time.

2. The method of claim 1, wherein said energy is acoustical energy and said fluid is a liquid which is in a hostile environment.

3. Apparatus for determining the velocity of fluid flow in a conduit between an upstream tracer production station and a downstream tracer detection station, the combination comprising a known length of conduit between said upstream and downstream stations, means for producing bursts of energy at said upstream station, focusing means for transmitting said bursts of energy through the wall of said conduit and for focusing the energy in each of said bursts in the fluid in said conduit at said upstream station, means for detecting the passage of the tracers created by each focused burst of energy at said downstream detection station, means for measuring the travel time of said tracers between said stations, and circuit means interconnecting said producing means and said detecting means for producing a signal proportional to the speed of fluid flow between said stations based upon said measured travel time and said known distance between said stations.

4. The combination of claim 3, and a meter connected to said circuit means, whereby said signal may cause said meter to read directly in terms of the velocity of said liquid flow.

5. The combination of claim 3, wherein said energy comprises acoustical energy.

6. The combination of claim 5, said bursts of energy producing means and said energy focusing means comprising a transducer located at the focus of a parabolic reflecting mirror so arranged to direct the energy from said transducer off the mirror and through a lens coupled by coupling means to said conduit at said upstream station, and means for providing a liquid environment for said transducer, said mirror and said lens.

7. The combination of claim 6, said lens consisting of silicone rubber.

8. The combination of claim 6, said coupling means consisting of a shoe located and secured between said lens and said conduit.

9. The combination of claim 8, said shoe consisting of epoxy.

10. The combination of claim 8, said shoe consisting of aluminum.

11. The combination of claim 3, said detecting means at said downstream station comprising a pair of transducers for establishing an energy beam between themselves across said conduit, whereby passage of a tracer through said beam can be detected to thereby detect the presence of said tracer at said downstream station.

12. The combination of claim 11, said detector beam consisting of a beam of acoustical energy.

13. The combination of claim 3, wherein said fluid in said conduit between said stations is a liquid and is in a hostile environment.

* * * * *